E. J. BUCKINGHAM.
APPARATUS FOR PREVENTING SIDE SLIP OF MOTOR ROAD VEHICLES.
APPLICATION FILED APR. 30, 1913.
1,107,256.
Patented Aug. 18, 1914.
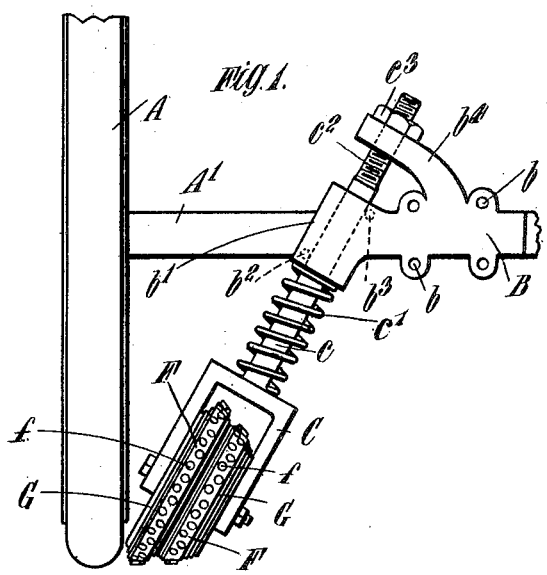
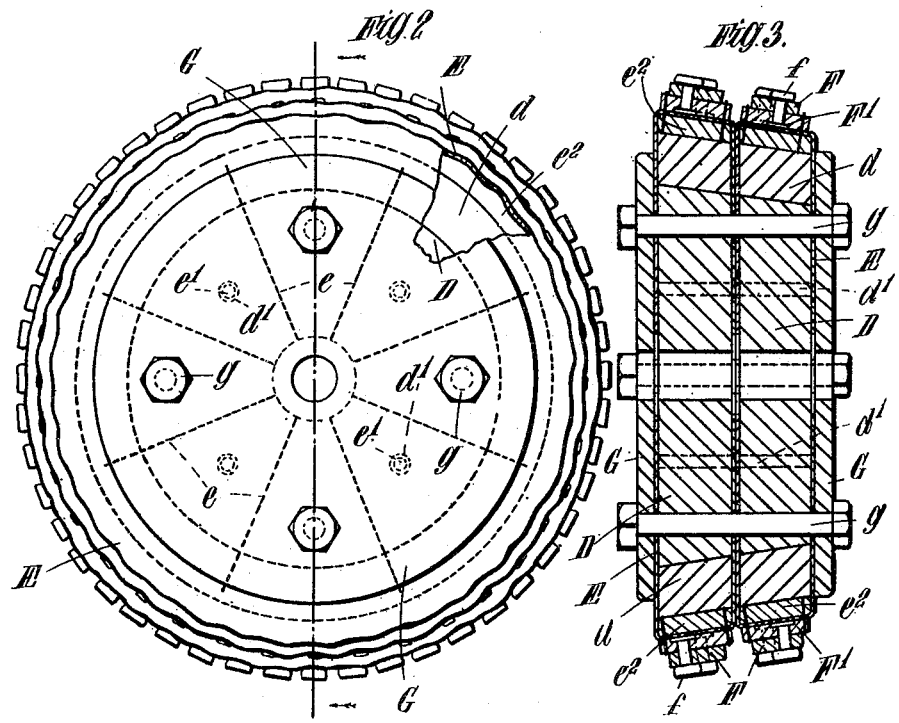

UNITED STATES PATENT OFFICE.

EDWARD JOHN BUCKINGHAM, OF BRIXTON OVAL, LONDON, ENGLAND.

APPARATUS FOR PREVENTING SIDE SLIP OF MOTOR ROAD-VEHICLES.

1,107,256.  Specification of Letters Patent.  Patented Aug. 18, 1914.

Application filed April 30, 1913. Serial No. 764,493.

*To all whom it may concern:*

Be it known that I, EDWARD JOHN BUCK-INGHAM, a subject of the King of Great Britain, residing at 5 Oval House, Brixton Oval, in the county of London, England, have invented certain new and useful Improvements in Apparatus for Preventing Side Slip of Motor Road-Vehicles, of which the following is a specification.

This invention relates to a device for the prevention of side-slip of motor road vehicles, of the type in which an anti-skidding resiliently mounted wheel rolls at an angle upon the road close to the ordinary vehicle wheel. In a device of this kind difficulty is found in making a wheel which gives sufficient grip upon the ground without tearing or injuring its surface and which is at the same time sufficiently strong to withstand the heavy strains to which it is subjected.

The chief object of the present construction is to provide a wheel that possesses the necessary qualities of strength and grip without liability to injure the road.

According to my invention the anti-skidding wheel is constructed of two main disk elements of similar form but different size, bolted together to form a single wheel, each element comprising a strong metal disk having a thick tire preferably of comparatively hard rubber surrounded by stout outer leather tires or non-skidding bands carrying metal studs or other road gripping devices, the tire and disk being entirely inclosed in a leather sheath to which the non-slipping bands are stitched. As the wheel rolls upon the road at an angle the two wheel elements must be beveled or conical to give a flat bearing on the road and to bring the whole width of the wheel into action. To give a solid support to the wheel it is carried in a strong fork the stem of which slides in a lug on a heavy bracket bolted on the axle, an upwardly extending arm on the bracket carrying the upper end of the stem, which may be threaded to receive an adjusting nut. A spring on the lower part of the stem keeps the wheel on the ground and, to prevent danger of jamming, small rollers may be provided in the bracket lug against which the fork stem bears.

In order that the said invention may be clearly understood and readily carried into effect, the same will now be described more fully with reference to the accompanying drawings, in which:—

Figure 1 is a side elevation of the complete device in place. Fig. 2 is a face view of one of the wheel elements; and Fig. 3 is a cross section through the wheel.

A is the ordinary vehicle wheel and A' the axle.

B is the bracket bolted at $b$ on the face of the axle and having at one end the sloping lug $b'$ provided with a square hole to receive the square stem $c$ of the fork C.

D, D are the central solid metal disks of the two anti-skidding wheel elements, provided with the tires $d$ of comparatively hard rubber.

E, E are the leather sheaths inclosing the tires and disks.

F, F' are outer non-slipping leather bands.

G, G are metal binding disks through which the bolts $g$ pass to lock the two wheel elements together in order to form a single solid wheel of great strength.

Referring first to the construction of the anti-skidding wheel, the leather sheaths E are each cut along the radial lines $e$ to form a number of radial flaps which can be turned back to allow the disk D and tire $d$ to be inserted. When in place the bolts $g$ secure the flaps directly on the disks, but as the number of flaps desirable may be greater than the number of bolts alternate flaps may be simply nailed at $e'$ to wooden plugs $d'$ inserted in holes in the disks D. Inside the periphery of the sheath E is a leather band $e^2$, the inner non-slipping band F' being stitched to the band $e^2$ through the sheath E. The road gripping studs $f$ rivet the two bands F and F' together.

The two main elements of the wheel are of different sizes, the disks D, tires $d$ and leather bands all tapering from the outer side of the wheel to the inner side at an angle corresponding to the angle at which the wheel is set, as shown in Fig. 1. Otherwise the two wheel elements are of similar shape and construction. When the binding disks G on the two sides of the wheel are tightened up by the bolts $g$ all the parts are locked together in an efficient manner so that the greatest resistance is afforded to any side pressure tending to distort the wheel.

Referring now to the method of supporting the fork carrying the anti-skidding wheel, in order to prevent any binding action on the square stem $c$ of the fork C owing to the angle at which the wheel is set, small rollers $b^2$ $b^3$ may be provided inside the lug $b'$, the lower roller $b^2$ bearing against the outer face of the stem and the upper roller $b^3$ bearing against the inner face, so that any leverage on the fork due to the action of the ground on the wheel would be met by the two rolling contacts at top and bottom of the lug $b'$ and there would be no danger of gripping the stem $c$ in such a manner that the spring $c'$ holding the wheel resiliently on the ground would be prevented from acting. To provide increased support for the stem it is made with a screw threaded extension $c^2$ passing through the end of an arm $b^4$ projecting from the upper side of the bracket B. A nut $c^3$ on the screw $c^2$ forms an adjustable stop which allows the wheel to meet and roll on the ground but prevents its further extension in case the vehicle wheel is lifted from the surface of the ground.

What I claim and desire to secure by Letters Patent of the United States is:—

1. In a device for the prevention of side-slip of vehicles, an anti-skidding wheel comprising a plurality of solid metal disks having beveled edges, each provided with a thick solid tire tapered to the bevel of the disks, a plurality of leather sheaths completely inclosing the said disks and cut radially from center to circumference to form a series of opening flaps, a pair of binding plates on opposite sides of the disks, a set of bolts passing completely through the disks and binding plates and locking the disks together with the sheaths gripped between the adjacent disks and between the disks and binding plates, and a non-slipping outer band secured upon each of the said sheaths.

2. In a device for the prevention of side-slip of vehicles, an anti-skidding wheel comprising a plurality of metal disks, each provided with a thick tire, an inclosing leather sheath, a strengthening band inside the periphery of the sheath, a non-slipping outer band stitched to the said sheath and strengthening band, and means for securing the disks and associated parts together to form a heel having a plurality of treads.

3. In a device for the prevention of side-slip of vehicles, a spring pressed anti-skidding wheel, a sloping wheel carrier, a bracket on the vehicle supporting the carrier in a sliding manner, and rollers within the said bracket adapted to bear on opposite sides of the said wheel carrier and to meet any leverage on the carrier due to the action of the ground.

In testimony whereof I affix my signature in presence of two witnesses.

EDWARD JOHN BUCKINGHAM.

Witnesses:
T. SELBY WARDLE,
W. T. SKERTEN.

---

Copies of this patent may be obtained for five cents each, by addressing the "Commissioner of Patents, Washington, D. C."